(12) United States Patent
Luick

(10) Patent No.: US 7,058,678 B2
(45) Date of Patent: Jun. 6, 2006

(54) FAST FORWARDING ALU

(75) Inventor: David Arnold Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 634 days.

(21) Appl. No.: 10/039,017

(22) Filed: Jan. 2, 2002

(65) Prior Publication Data

US 2003/0126178 A1    Jul. 3, 2003

(51) Int. Cl.
G06F 7/50    (2006.01)
G06F 7/00    (2006.01)
(52) U.S. Cl. .................. 708/670; 708/707; 708/525
(58) Field of Classification Search ............ 708/670, 708/706–707, 710–713, 525
See application file for complete search history.

(56) References Cited

U.S. PATENT DOCUMENTS 5,036,483 A * 7/1991 Virtue .................. 708/707
5,047,975 A * 9/1991 Patti et al. ............ 708/706
5,517,440 A * 5/1996 Widigen et al. ........ 708/518
5,548,546 A * 8/1996 Jang et al. ............ 708/706
5,745,397 A * 4/1998 Nadehara ............. 708/700
5,912,833 A * 6/1999 Jang et al. ............ 708/707
6,832,235 B1 * 12/2004 Muramatsu et al. ..... 708/710

* cited by examiner

Primary Examiner—Tan V. Mai
(74) Attorney, Agent, or Firm—Patterson & Sheridan LLP

(57) ABSTRACT

An apparatus and method for performing fast arithmetic operations, including addition, in a pipelined circuit is described. The apparatus and method operating on a first binary number and a second binary number comprise: a first arithmetic logic unit (ALU) operating on a first lower portion of the first binary number and a second lower portion of the second binary number to produce a first result and a carry out signal; and a second ALU operating on a first upper portion of the first binary number and a second upper portion of the second binary number to produce a second result; wherein at least a portion of the pipelined circuit stalls in response to the carry out signal. Another embodiment includes memory comprising a plurality of words, each word comprising data bits and a flag bit indicating a predetermined number of the most significant data bits are all zero.

13 Claims, 4 Drawing Sheets

FAST FORWARDING ALU

BACKGROUND OF THE INVENTION

1. Field of the Invention

The present invention relates to the field of electronic circuits. More specifically, embodiments of the present invention relate to Arithmetic Logic Units (ALUs), and in particular, ALUs included in a pipelined processor.

2. Description of the Related Art

Users of data processing systems such as computers and the like continue to demand greater and greater performance from such systems for handling increasingly complex and difficult tasks. Greater performance from the processors that operate such systems may be obtained through faster clock speeds, so that individual instructions are processed more quickly. However, relatively greater performance gains have been achieved through performing multiple operations in parallel with one another.

One manner of parallelization is known as "pipelining", where instructions are fed into a pipeline for an execution unit in a processor that performs different operations necessary to process the instructions in parallel. For example, to process a typical instruction, a pipeline may include separate stages for fetching the instruction from memory, executing the instruction, and writing the results of the instruction back into memory. Thus, for a sequence of instructions fed in sequence into the pipeline, as the results of the first instruction are being written back into memory by the third stage of the pipeline, a next instruction is being executed by the second stage, and still a next instruction is being fetched by the first stage. While each individual instruction may take several clock cycles to be processed, since other instructions are also being processed at the same time, the overall throughput of the processor is much greater. With respect to pipelining, the term "stage" generally refers to the combinational logic between registers or latches.

Pipelining is the placing of logic between various types of memories. Known memories include registers, latches, and Random Access Memory (RAM). A register is a type of word-based memory that stores a set of bits, and generally, all the bits are written in parallel on the edge of a clock or similar event in time. A latch is a type of word-based memory that stores a set of bits, and generally, the bits are stored while an enable signal is active, thereby allowing input changes to propagate to outputs while the enable signal is active. A latch is sometimes called a "half-register". Putting logic between half-registers has the advantage of partial cycle stealing from a prior stage, and can reduce the cycle time of a pipelined circuit. Random Access Memory (RAM) is an array-based memory that stores a plurality of words, each word being a set of bits. RAMs can have a plurality of access ports, thereby allowing multiple reads and/or writes from/to the RAM. Fast RAM, generally with multiple access ports, is sometimes called a register file.

Individual arithmetic operations, such as addition and multiplication, can also be pipelined. For example, a multiplier can be designed with four stages, and take four clock cycles to compute a result corresponding to a particular input, but accept new inputs each clock cycle. Pipelining can be applied to memories as well. For example, a memory could have the following stages: address decode; memory array access; and data output. A pipelined circuit can be composed of many stages, and include a plurality of memory, arithmetic, and logic circuits.

Greater parallelization can also be performed by attempting to execute multiple instructions in parallel using multiple pipelined execution units in a processor. Processors that include multiple execution units are often referred to as "superscalar" processors, and such processors include scheduling circuitry that attempts to efficiently dispatch instructions to different execution units so that as many instructions are processed at the same time as possible. Relatively complex decision-making circuitry is often required, however, because oftentimes one instruction cannot be processed until after another instruction is completed. For example, if a first instruction loads a register with a value from memory, and a second instruction adds a fixed number to the contents of the register, the second instruction typically cannot be executed until execution of the first instruction is complete.

The use of relatively complex scheduling circuitry can occupy a significant amount of circuitry on an integrated circuit device, and can slow the overall execution speed of a processor. For these reasons, significant development work has been devoted to Very Long Instruction Word (VLIW) processors, where the decision as to which instructions can be executed in parallel is made when a program is created, rather than during execution. A VLIW processor typically includes multiple pipelined execution units, and each VLIW instruction includes multiple primitive instructions known as parcels that are known to be executable at the same time as one another. Each primitive instruction in a VLIW may therefore be directly dispatched to one of the execution units without the extra overhead associated with scheduling. VLIW processors rely on sophisticated computer programs known as compilers to generate suitable VLIW instructions for a computer program written by a computer user. VLIW processors are typically less complex and more efficient than superscalar processors given the elimination of the overhead associated with scheduling the execution of instructions.

It is common practice for pipelined logic to be synchronously clocked. That is, a single timebase clocks the entire circuit. Alternatively, various portions of the pipelined logic can be clocked with different timebases (i.e., different frequencies), and these different timebases are usually (although not necessarily) rational number multiples of each other, thereby allowing them to be derived from a single frequency source. In the case of asynchronous circuits, there can be multiple timebases that are asynchronous to one another. It is also possible for registers to be clocked by detecting when the computation of input data is complete (i.e., self-timed circuits), resulting in fully asynchronous behavior.

One design consideration in pipelined circuits is stalling. Stalling occurs in a pipelined circuit when at least one stage waits for some data. A simple example is an execution unit waiting until a next instruction is available; that is, the execution unit stalls. In general, mitigation of stall is desirable, but it is the average sustainable performance that is being maximized in most designs. Hence, introducing infrequent stalls in order to increase overall performance can be a fruitful design choice.

Another design consideration in pipelined circuits is the critical path. The critical path is the path through a circuit that takes the longest time to propagate from input to output. The critical path determines the smallest allowable clock period where, the smaller the clock period, the higher the performance. Accordingly, the performance is inversely related to the clock period. In pipelined circuits, this critical path is measured from register-to-register or latch-to-latch (or between any two of the various types of memory circuits).

One possible critical path in pipelined logic is through an ALU. A typical ALU performs at least some of the following operations: adds, shifts, rotates, AND, OR, NAND, NOR, and the like operations. Generally, the critical path through an ALU occurs for the add operation, primarily due to an arithmetic carry through all the bits. An arithmetic carry is the "carry our" from a bit position into the next most significant bit. For example, in an 8-bit adder, adding the bit patterns '01111111' and '01111111' causes arithmetic carries to propagate through all the bit positions. A simple type of adder allows carry values to ripple from the least significant bit to the most significant bit, but this is slow due to a long critical path. More sophisticated adders use a carry-look-ahead circuit to generate carry values. But, even for carry-look-ahead circuits, wider (i.e., more bit position) adders have a longer critical path.

Recently, microprocessor architectures have been extended from 32-bit architectures to 64-bit architectures. This change increases the width of the ALU, increasing the critical path delay through the ALU (e.g., by increasing the number of bits for the carry-look-ahead logic) and reducing performance. Hence, it is desirable to reduce the critical path though 64-bit ALUs.

Prior art solutions split each of the ALU's two 64-bit two operands (A and B) into two 32-bit operands by separating the high order bits from the low order bits (respectively, $A_H$ and $A_L$, and $B_H$ and $B_L$). $A_L$ and $B_L$ are fed into a first 32-bit adder, and $A_H$ and $B_H$ are fed into both a second adder and a third adder. The second adder has its carry input set to "0", while the third adder has its carry input set to "1". The output sum from the first adder forms the lower bits of the result. The carry out from the first adder selects (by a multiplexer) between the output sum from the second adder and the output sum from the third adder to form the higher bits of the result. The three adders operate in parallel. Three adders are used so that the addition of the upper bits can start before the carry output from the low order bits is determined. While the critical path is reduced, the disadvantages are: additional area due to three adders (rather than two); circuit delay due to the multiplexer; and additional power consumption due to additional switching of circuits.

In the context of an ALU, forwarding of an arithmetic result refers to making use of the result in the next clock cycle. For example, if X+Y+Z is to be computed, then X+Y is computed in a first arithmetic unit and forwarded to a next arithmetic unit that adds the Z value. Forwarding must be done in an efficient manner, without increasing the critical path or causing the pipeline to stall frequently. Forwarding is generally done by routing the wires of a data bus from the first arithmetic unit to the second. In the prior art, in order to reduce the critical path delay, wide metal wires are used for forwarding, but this has the significant disadvantages of: consuming numberous routing tracks (e.g. 4× width wires instead of the smallest 1× width wires); and requiring larger buffers to drive a larger wiring load, thereby increasing area and power consumption.

Therefore, there is a need for a fast forwarding ALU that overcomes the deficiencies described above.

SUMMARY OF THE INVENTION

An apparatus and a method for performing faster arithmetic operations in a pipelined circuit is described. For example, a 64-bit adder can be implemented with two independent 32-bit adders, thereby both decreasing required die area and improving performance.

The apparatus and method operating on a first binary number and a second binary number comprise: a first arithmetic logic unit (ALU) operating on a first lower portion of the first binary number and a second lower portion of the second binary number to produce a first result and a carry out signal; and a second ALU operating on a first upper portion of the first binary number and a second upper portion of the second binary number to produce a second result; wherein at least a portion of the pipelined circuit stalls in response to the carry out signal.

Another embodiment, for a pipelined circuit apparatus comprises: an arithmetic logic unit (ALU) operating on two binary numbers, the ALU comprising: a first logic circuit generating a carry out signal from a bit location that is not the most significant bit of the ALU; wherein at least one stage of the pipelined circuit stalls in response to the carry out signal.

Another embodiment includes memory comprising a plurality of words, each word comprising data bits and a flag bit indicating a predetermined number of the most significant data bits are all zero.

Another embodiment of a pipelined circuit comprises: a memory with a plurality of words, each word comprising a plurality of data bits and a flag bit indicating a predetermined number of most significant bits of the data word are all zero, the predetermined number not being all of the data bits; and an arithmetic logic unit (ALU) receiving contents of at least one of the words, the ALU using the flag bit within the received word to determine whether an upper portion of any input data can be forwarded.

In another embodiment, an integrated circuit comprises a pipelined circuit for performing operations on a first binary number and a second binary number, the pipelined circuit comprises: a first arithmetic logic unit (ALU) operating on a first lower portion of the first binary number and a second lower portion of the second binary number to produce a first result and a carry out signal; and a second ALU operating on a first upper portion of the first binary number and a second upper portion of the second binary number to produce a second result; wherein at least one stage in the pipelined circuit stalls in response to the carry out signal.

An integrated circuit comprising a pipelined arithmetic logic unit (ALU) operating on two binary numbers, the ALU comprising: a first logic circuit generating a carry out signal from a bit location near a middle bit position in one of the two binary numbers; wherein at least of one stage in the pipelined ALU stalls in response to the carry out signal.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

In the following detailed description of a fast forwarding ALU, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention. As a example, specific bus bit widths, data bit widths, and arithmetic unit bit widths are used to illustrate concepts, but the concepts can be applied to an apparatus with any number of bits. In the examples that include numbered bit positions, the most significant bit is numbered "0".

In the recently available 64-bit processors, 64-bit addresses are beginning to dominate over 32-bit address, but, it is almost never the case that a value greater than 32 bits ($2^{32}-1$) is ever added to a 64-bit base register. In some application programs, 95% of address adds are "D-form", where a 16-bit constant (i.e., a displacement) is added to a 64-bit base register for load and store address generation. Similarly, nearly 90% of ALU adds are adding a 16-bit or less constant value (from an immediate field in an instruction) to a 64-bit base. Conversely, the remaining register-register additions that are performed are adding 16-bit, 24-bit, or 32-bit offset values to a 64-bit base. However, the average number of significant bits in an offset is small, typically only about 10 to 12 bits, so that a carry out of adder bits 32–63 is very unlikely under these conditions.

Figure 1:
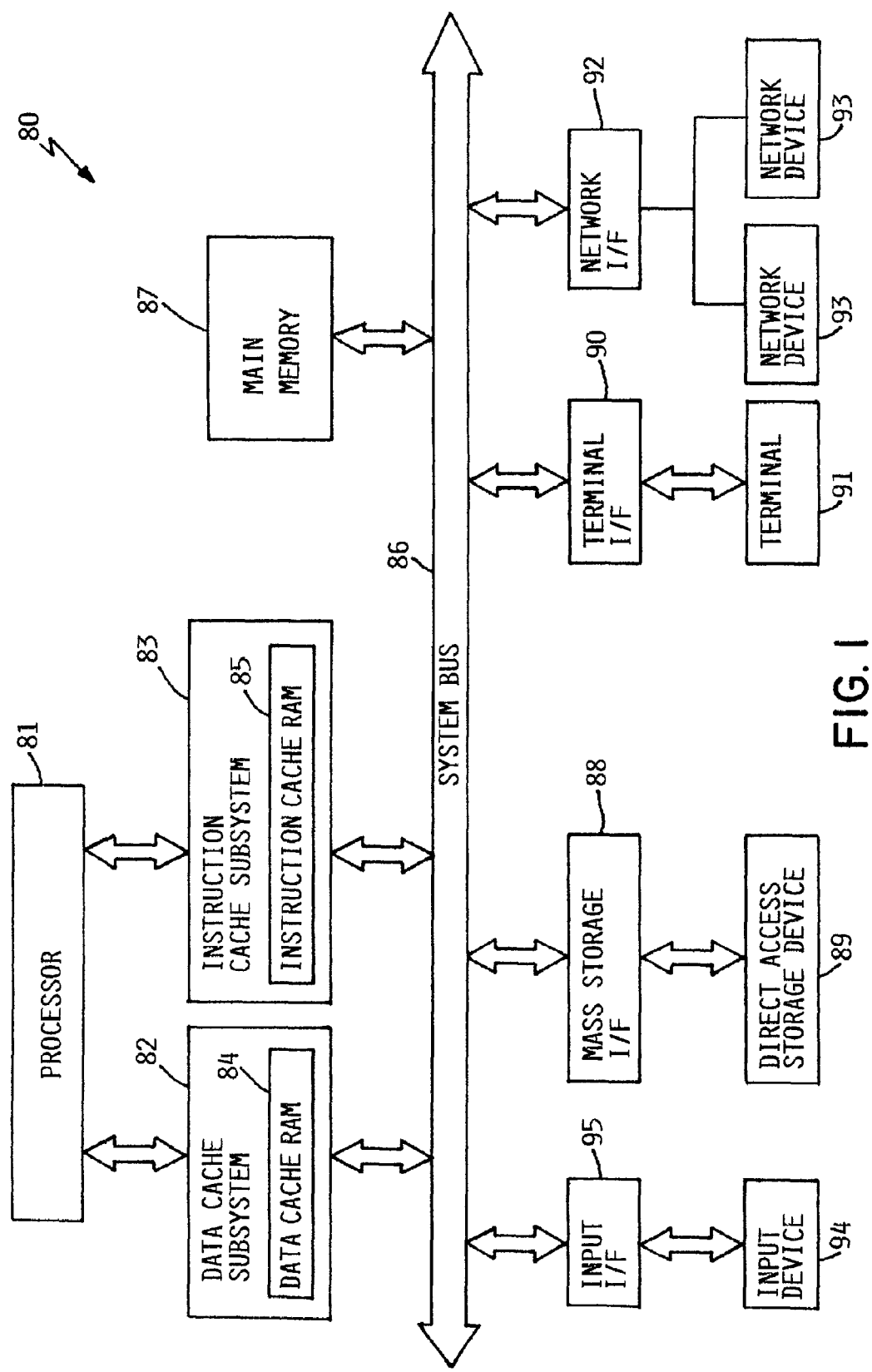
FIG. 1 shows a computer system.

FIG. 1 shows a computer system 80 according to an embodiment. Illustratively, the computer system 80 includes a system bus 86, at least one processor 81 coupled to the system bus 86 via a data cache subsystem 82 and an instruction cache subsystem 83. The data cache subsystem 82 includes a data cache RAM 84. The instruction cache subsystem 83 includes an instruction cache RAM 85. The computer system 80 also includes an input device 94 coupled to system bus 86 via an input interface 95, a storage device 89 coupled to system bus 86 via a mass storage interface 88, a terminal 91 coupled to system bus 86 via a terminal interface 90, and a plurality of networked devices 93 coupled to system bus 86 via a network interface 92.

Terminal 91 is any display device such as a cathode ray tube (CRT) or a plasma screen. Terminal 91 and networked devices 93 are desktop or PC-based computers, workstations, network terminals, or other networked computer systems. Input device 94 can be any device to give input to the computer system 80. For example, a keyboard, keypad, light pen, touch screen, button, mouse, track ball, or speech recognition unit could be used. Further, although shown separately from the input device, the terminal 91 and input device 94 could be combined. For example, a display screen with an integrated touch screen, a display with an integrated keyboard or a speech recognition unit combined with a text speech converter could be used Storage device 89 is a DASD (Direct Access Storage Device), although it could be any other storage such as floppy disc drives or optical storage. Although storage 89 is shown as a single unit, it could be any combination of fixed and/or removable storage devices, such as fixed disc drives, floppy disc drives, tape drives, removable memory cards, or optical storage. Main memory 87 and storage device 89 could be part of one virtual address space spanning multiple primary and secondary storage devices.

The contents of main memory 87 can be loaded from and stored to the storage device 89 as processor 81 has a need for it. Main memory 87 is any memory device sufficiently large to hold the necessary programming and data structures of the invention. The main memory 87 could be one or a combination of memory devices, including random access memory (RAM), non-volatile or backup memory such as programmable or flash memory or read-only memory (ROM). The main memory 87 may be physically located in another part of the computer system 80. While main memory 87 is shown as a single entity, it should be understood that memory 87 may in fact comprise a plurality of modules, and that main memory 87 may exist at multiple levels, from high speed registers and caches to lower speed but larger DRAM chips.

For the great majority of ALU additions in a processor 81, which are address additions where dependencies can occur, a 32-bit adder with no carryout is sufficient for more than 99% of the cases that are likely to be encountered. Full 64-bit additions are not dominant, but can and do occur. However, the vast majority are not cycle-cycle dependent and most would occur in independent inner loops. It is one of the objectives of the present patent to exploit this high probability of the likely cases. The present patent describes an advantageously faster adder that handles these likely cases.

In one embodiment, rather than construct a wide ALU (e.g. 64 bits) with one monolithic block of combinational logic, a wide ALU is split into an upper ALU and a lower ALU (e.g., 32 bits each), with upper and lower portions of the operands input to their respective ALU. The lower ALU produces a carry out signal that indicates the result from the upper ALU needs to be incremented. When this carry out is false, no additional action is take. When this carry out is true, it is used to stall the pipeline in order to introduce a clock cycle to perform the increment. This is particularly effective for adding offsets to base addresses. In one aspect, a carry out signal is generated from a bit location near a middle bit position within a wide ALU, and this carry out signal is used to stall at least part (i.e., some stages) of the pipelined logic.

In another embodiment, a fast forwarding bus carries data that assumes the carry out is zero (i.e., no carry) and that the upper ALU can be bypassed. The fast forwarding bus is useful for cases where the full result is needed on the next clock cycle. The fast forwarding bus holds an "only speculatively correct" result for the wide ALU, and the determination as to whether this result can be used on the next clock cycle is determined by the carry out signal. This "speculatively correct" result can be written to various memories, and then only used on subsequent clock cycles if determined to be correct. This embodiment takes advantage of recognizing when the most significant bits of either operand are all zeros. Since the upper ALU is bypassed by one of the operands, that part of the operand can be forwarded to: (1) the next unit or ALU; and (2) fed back to upper register bits; and furthermore, the bypassing allows that part of the operand to reach its destination well within one clock cycle. For this reason, very small and area efficient wires can be used for these bits on the fast forwarding bus, thereby saving power and die area.

In another embodiment, as an aid to use the fast forwarding bus, a special flag bit is used to indicate the upper bits of an operand are all zeros. This special flag bit is carried along with the data, and stored in memories along with the corresponding data. In other words, a special flag bit indicates a predetermined number of most significant bits of a data value are all zero, the predetermined number not being all of the data bits. In contrast, the prior art includes flag bits that indicate all the bits of a data value are zero.

Figure 2:
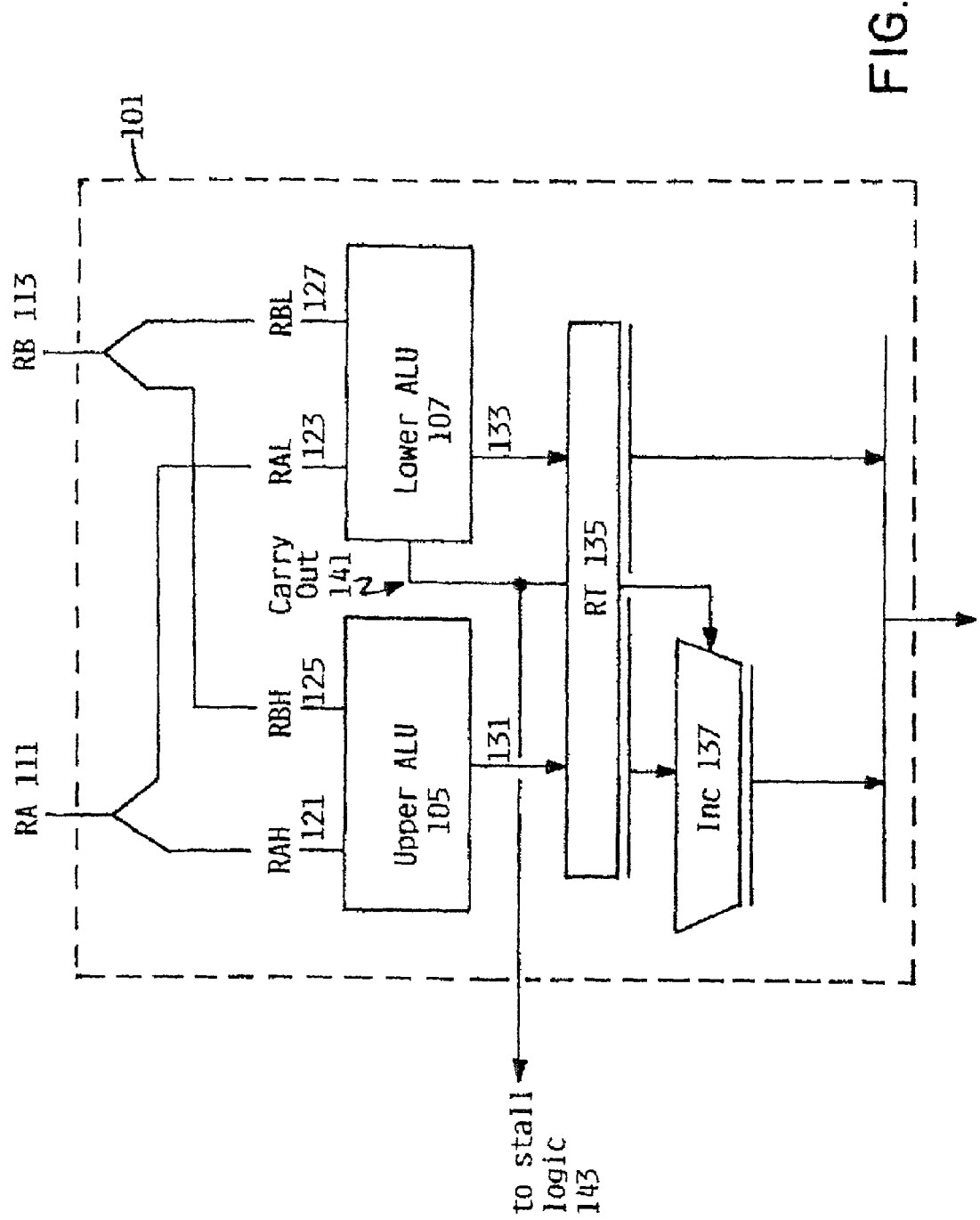
FIG. 2 is an embodiment of the ALU.

As shown in the example embodiment of FIG. 2, a wide ALU (e.g. 64 bits) is split into an upper ALU 105 and a lower ALU 107 (e.g., 32 bits each). The inputs to the wide ALU 101, RA 111 and RB 113, are split, respectively, into RAH 121, RAL 123, RBH 125, and RBL 127, and input to the upper ALU 105 and the lower ALU 107. The two ALUs 105, 107 each produce a result 131, 133 that is written to a register 135. The lower ALU 107 also produces a carry out signal 141. When carry out 141 is zero (i.e., no carry), then the result in the register 135 is the correct sum of RA 111 and RB 113. But, when carry out 141 is one (i.e., a carry), then the upper ALU result 131 must be incremented, and that is done with incrementing logic 137 (shown after the register 135 in FIG. 2). While this may at first appear to have worsened the critical path (due to the incrementing logic 137), the critical path is improved by bypassing the incrementing logic 137 for all cases, except when carry out 141 is one (i.e., a carry out of the lower adder 107 has occurred). In that exception case, the incrementing logic 137 is not bypassed, but a pipeline stall is introduced to account for the additional delay through the incrementing logic 137. The pipeline stall inserts a clock cycle (or two clock cycles, if necessary) to account for not bypassing the incrementing logic. The carry out signal 141 goes to 143 stall logic. Stall logic is know in the art, and is not described here. A carry out signal 141 from a bit location near a middle bit position in the wide ALU 101 is generated, and then using the carry out signal 141 to stall at least part of the pipelined logic. Alternatively, the carry out signal 141 can be generated at any bit position other than the most significant bit.

Therefore, using the example of a 64-bit ALU, the critical path is improved from that of a 64-bit ALU to that of a 32-bit ALU. If a 32-bit ALU is 30% faster than a 64-bit ALU, then the average mount of time would change from 1.0 (normalized) to (% no_stall)(1.0–0.30)+2(% stall)(1.0–0.30). The "2" is due to taking two clock cycles. If stalls occur 1% of the time, then the average would be 0.707, an improvement of 29.3%. If stalls occur 5% of the time, then the average would be 0.735, an improvement of 26.5%. If this ALU 101 is included in a synchronously clocked pipelined machine, then the entire machine's performance can be improved if the ALU is the limiting part in determining the clock period. Additionally, die area is reduced because two 32-bit adders require considerably less area than one 64-bit adder.

The register 135 can be replaced by any type of memory, and the advantages of the invention remain. Also, the incrementing logic 137 can be incorporated into the register 137 so as to provide a means to increment the upper adder result 131 and store the incremented value back into the register 137.

If a suitable fast 2-tree level Domino 32-bit adder implementation is used, the ALU delay plus the forwarding delay path is comparable to a desired limit of minimum cycle time (latch +3 trees per cycle) and can typically match the delays of other critical 1-cycle elements, such as register files, cache arrays, translation look-aside buffers (TLBs), etc.

Figure 3:
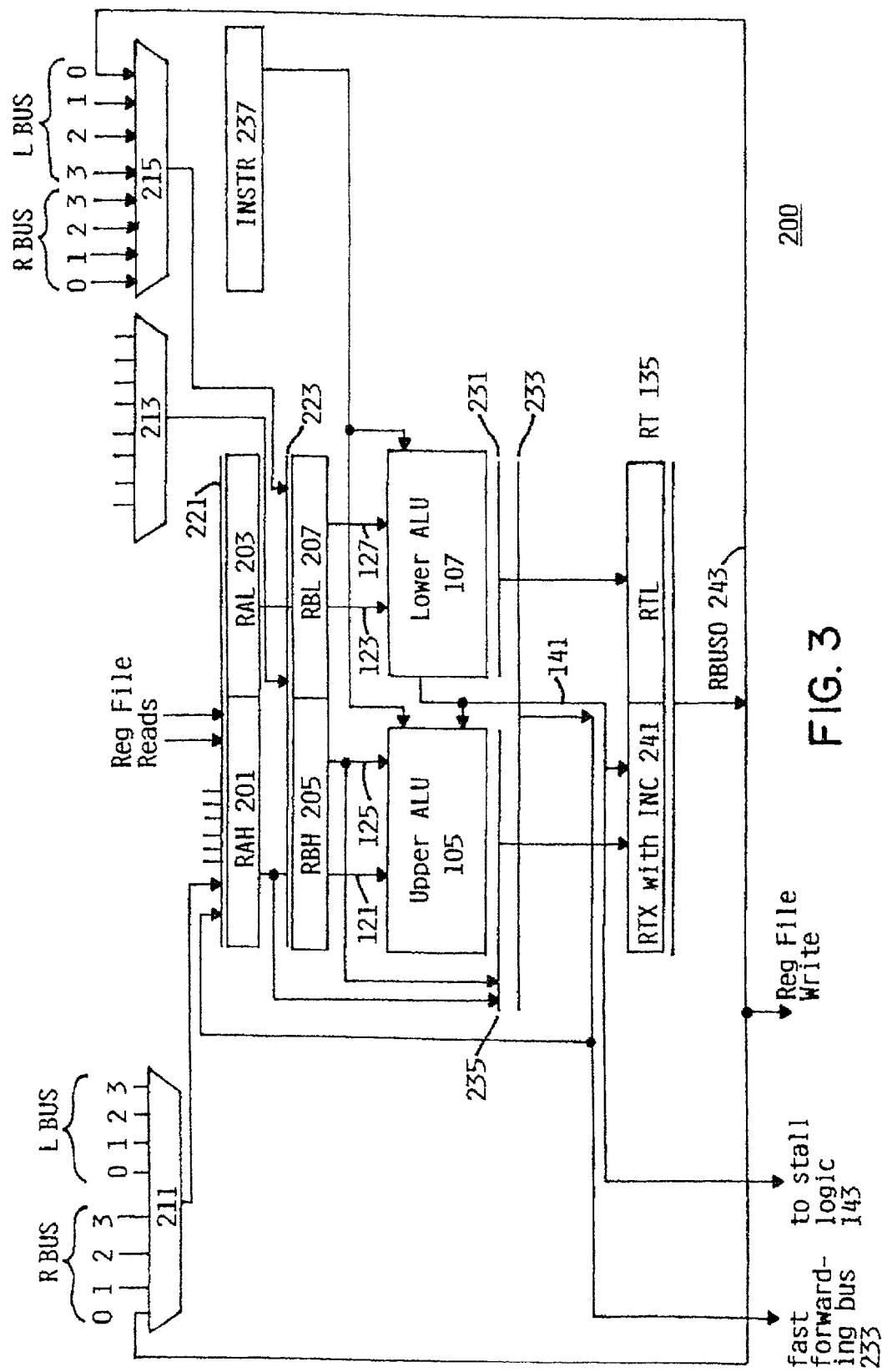
FIG. 3 is another embodiment of the ALU.

A more detailed embodiment of the ALU 200 is shown in FIG. 3. The figure shows the input for the upper ALU 105 and lower ALU 107 coming from registers 201, 203, 205, 207. These registers 201, 203, 205, 207 receive input from busses 211, 213, which are driven from a plurality of sources. This particular embodiment shows the busses 221, 223 driven by multiplexers 211, 213, 215, as well as other sources. The lower ALU 107 outputs its result onto two busses 231, 233: (1) the bus 231 used to write to the output register 135; and (2) the fast forwarding bus 233. The upper ALU 105 two buses: (1) the bus 235 used to write to the output register 135; and (2) the fast forwarding bus 233. Depending on implementation details the three busses 231, 233, 235 could be a single bus. An instruction register 237 for controlling the operation of the ALUs 105,107 is also shown in the FIG. 3.

To deal with the case of carry out 141 being a one (i.e., a carry exists), the output register 135 includes an upper part 241 that includes increment capability. Hence, if carry out is one, the ALU 200 stalls, and the stall cycle (or cycles) is used to increment the upper portion of the result. Therefore, the correct result of the ALU 200 is available on RBUSO 243 in either: (1) one clock cycle; or (2) more than one clock cycle due to a stall. In other words, the data in the output register 135 may be used as a second cycle dependent forward for all cases, but this is unlikely.

An embodiment includes the use of a fast forwarding bus 235 that carries data that assumes carry out is zero (i.e., no carry). The fast forwarding bus 235 is useful for cases where the full result is needed on the next clock cycle (as described above). If, during use of the ALU 200, next cycle forwarding is desired, carry out is zero, and the ALU 200 is adding a small offset (e.g., significant bits contained in only RBL 207 and none in RBH 205) to a base address value, only the following needs to be forwarded: (1) the result bits from the lower ALU 107; and (2) the upper bits of the base address value, which is data from either RAH 201 or RBH 205. Therefore, for this case, the upper bits of the base address (either RAH 201 or RBH 205) do not need to pass through the upper adder 105. The upper adder 105 is bypassed by having both RAH 201 and RBH 205 capable of driving the fast forwarding bus 235 (and the bus 231 used to write to the output register 135). Selecting the output from RAH 201 or RBH 205 is done by detecting an "all zeros" case for one or both. For example, if RBH 205 is all zeros, then RAH 201 is selected to drive the fast forwarding bus 235.

In other words, the fast forwarding bus 235 holds an "speculatively correct" result for the ALU 200, and the determination as to whether this result can be used on the next clock cycle is determined by carry out 141. This "speculatively correct" result can be written to various memories, and then only used on subsequent clock cycles if determined to be correct.

Since the upper bits (from either RAH 201 or RBH 205) do not go through the ALU, they have ample time within a clock cycle to be forwarded to: (1) the next unit or ALU; and (2) fed back to upper register bits (RAH 201 and/or RBH 205). For this reason, very small and area efficient wires can be used for these bits on the fast forwarding bus 235, thereby saving power and die area.

In the prior art, in order to reduce the critical path delay, wide metal wires are used for forwarding, but this has the significant disadvantages of: consuming numerous routing tracks (e.g. 4× width wires instead of the smallest 1× width wires); and requiring larger buffers to drive a larger wiring load, thereby increasing area and power consumption. In contrast, one embodiment of the fast forwarding ALU uses 1× pitch metal wires for the upper bits (from either RAH 201 or RBH 205) on the fast forwarding bus 235. In addition, two copies (i.e. driven by two buffers, or "drivers") of the most critical lower adder 107 result bits can be utilized, thereby further improving performance on the forwarding bus 235 by cutting its load and wire length in half. (The term "1×" is used to designate metal lines of "minimum width", which means the smallest metal (or other conductor) line widths that can be manufactured by a particular semiconductor fabrication process for a particular metal layer. The specification for a fabrication process is called the "design rules", and these include minimum widths for various conductive layers.)

Figure 4:
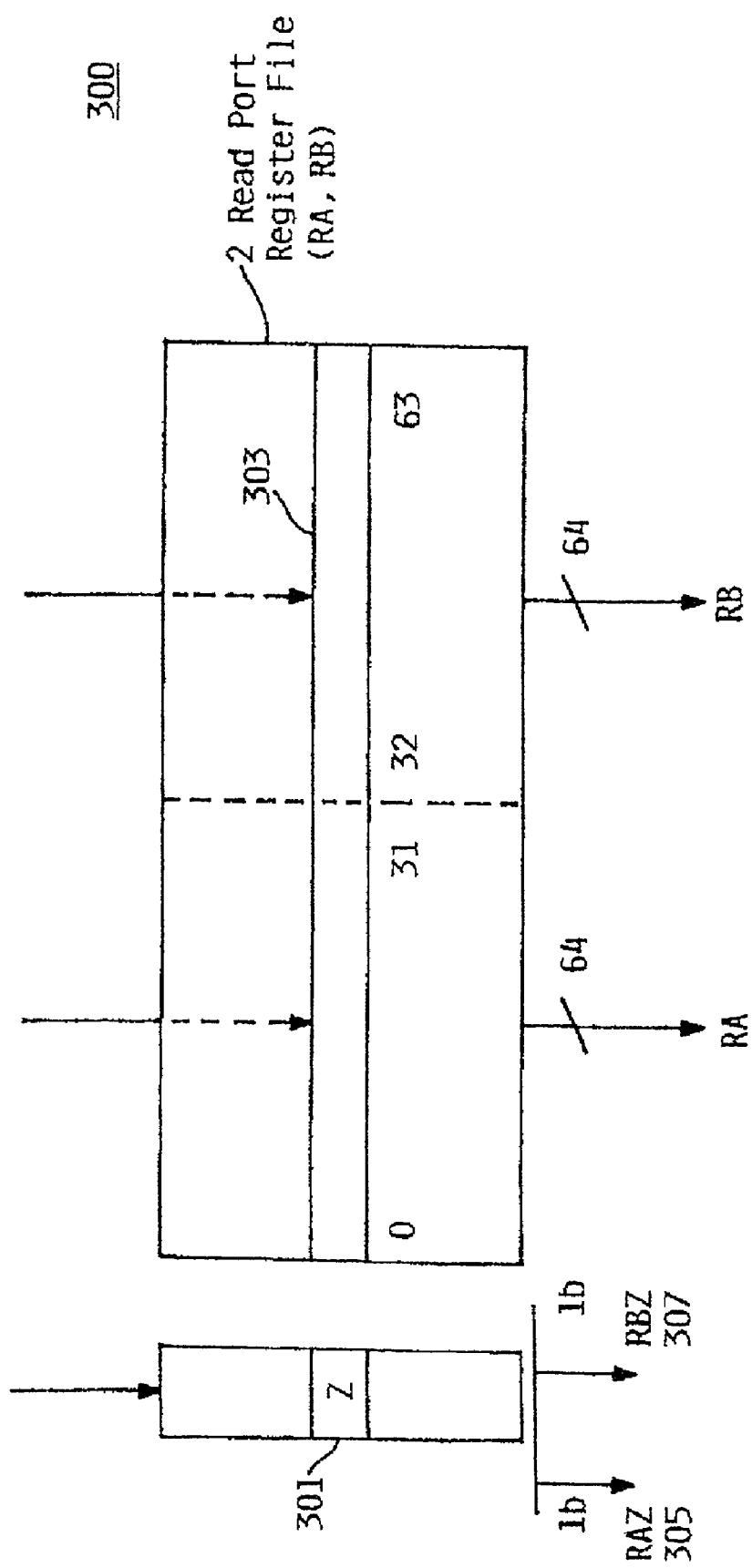
FIG. 4 is an example register file storing the special flag bit.

As an aid to use the fast forwarding bus 235, it would be advantageous to know whether RAH 201 and/or RBH 205 contain all zeros at the beginning of the clock cycle, thereby aiding in limiting the stall for a forward to one cycle. As exemplified in the register file shown in 300 FIG. 4, this is achieved by keeping a flag bit Z 301 in each memory word 303 (similarly included in other memories, such as registers, etc.) that indicates the high order bits are all zeroes. Arithmetic units can be designed to generate this condition code 301 along with the usual data and condition codes. If, when an addition is to be performed, the flag bits 305, 307 for the two operands are examined, and the upper adder 105 is not used if either flag 305, 307 indicates the presence of all zeros. The fast forwarding generates the correct result when there is not a one value at carry out 141. To further limit potential unexpected carry out 141 one values from the lower adder 107, the zero flag can be extended to indicate that more bits of the value is all zeros. For example, in a 64-bit ALU, the Z bit 301 could indicate that the upper 40 bits are all zeros, reducing the rate of unexpected carry outs by a factor of $2^8=256$.

In general, the carry out signal 141 can come from any bit location. In the above discussion, the carry out signal was assumed to be from a bit location at the center (e.g., bit 32 out of bits numbered 0 through 63). The carry out signal can come from any bit location near the middle of the operand bits, and, in fact, can be any bit location which is not the most significant bit location.

The above descriptions assume a wide ALU to be split into two equal smaller portions, but that assumption was used for illustrative purposes. The wide ALU can be split into three or more portions. Also, the portions do not need to be of equal size. While the discussion used the term ALU, those skilled in the art appreciate that any arithmetic unit can use the invention effectively, including pure adder circuits.

While the present invention has been described in particular embodiments, it should be appreciated that the present invention should not be construed as limited by such embodiments, but rather construed according to the below claims.

What is claimed is:

1. A pipelined circuit apparatus for performing operations on a first binary number and a second binary number, comprising:
   a first arithmetic logic unit (ALU) operating on a first lower portion of the first binary number and a second lower portion of the second binary number to produce a first result and a carry out signal;
   a second ALU operating on a first upper portion of the first binary number and a second upper portion of the second binary number to produce a second result; and
   a logic circuit selecting one of the first upper portion and the second upper portion in response to the first flag bit and the second flag bit, the selected upper portion used as the second result;
   wherein at least one stage in the pipelined circuit stalls by one or more clock cycles in response to the carry out signal to account for additional delay introduced by incrementing the second result when the carry out signal indicates a carry;
   wherein the first binary number is associated with a first flag bit, the first flag bit indicating a first predetermined number of most significant bits of the first binary number are all zero; and
   wherein the second binary number is associated with a second flag bit, the second flag bit indicating a second predetermined number of most significant bits of the second binary number are all zero.

2. The apparatus of claim 1 further comprising:
   a memory having a first memory portion receiving the first result and a second memory portion receiving the second result.

3. The apparatus of claim 2 further comprising:
   a logic circuit for incrementing a value stored in the second memory portion when the carry out signal indicates a carry.

4. The apparatus of claim 3 wherein:
   the incremented value is stored into the second memory portion in response to the carry out signal.

5. The apparatus of claim 2 wherein:
   the second memory portion is configured to increment a value stored in the second memory portion in response to the carry out signal.

6. The apparatus of claim 2 wherein:
   the memory stores a value used to address a random access memory.

7. The apparatus of claim 1 wherein:
   the first binary number is split in two at a first bit boundary to form the first upper portion and the first lower portion; and
   the second binary number is split in two at a second bit boundary to form the second upper portion and the second lower portion.

8. The apparatus of claim 1, further comprising:
   at least two buffers for each bit position in the second result, each the buffer receiving a corresponding bit value within the second result, each the buffer driving an electrically conductive line that has minimum width.

9. The apparatus of claim 1 wherein:
   the second binary number is split in two at a second bit boundary to form the second upper portion and the second lower portion.

10. A pipelined circuit apparatus, comprising:
    an arithmetic logic unit (ALU) operating on two binary numbers, the ALU comprising:
    a first logic circuit generating a carry out signal from a bit location that is not the most significant bit of the ALU;
    wherein at least one stage of the pipelined circuit stalls by one or more clock cycles in response to the carry out signal to account for additional delay introduced by incrementing the second result when the carry out signal indicates a carry; and
    a logic circuit selecting an upper portion of one of the two binary numbers, the selecting done in response to the first flag bit and the second flag bit;
    wherein a first flag bit is associated with a first of the two binary numbers, the first flag bit indicating a predetermined number of most significant bits of the first binary number are all zero; and
    wherein a second flag bit is associated with a second of the two binary numbers, the second flag bit indicating a predetermined number of most significant bits of the second binary number are all zero.

11. The apparatus of claim 10, the ALU further comprising:
    a first logic unit operating on lower portions of the two binary numbers to produce a first result;
    a second logic unit operating on upper portions of the two binary numbers to produce a second result;

a second logic circuit for incrementing the second result in response to the carry out signal to form an incremented value.

12. The apparatus of claim 11 wherein:

a final result for the ALU is formed by combining:
   the first result, and
   selection of one of the second result and the incremented value, the selection being done in response to the carry out signal.

13. The apparatus of claim 11, the ALU further comprising:

a first memory storing the first result; and a second memory conditionally storing either the second result or the incremented value, the condition determined in response to the carry out signal.

* * * * *